(12) United States Patent
Chun et al.

(10) Patent No.: US 11,227,724 B2
(45) Date of Patent: Jan. 18, 2022

(54) METHOD OF MANFACTURING MULTILAYER CERAMIC CAPACITOR AND MULTILAYER CERAMIC CAPACITOR

(71) Applicant: SAMSUNG ELECTRO-MECHANICS CO., LTD., Suwon-si (KR)

(72) Inventors: Jin Sung Chun, Suwon-si (KR); Hyo Kyong Seo, Suwon-si (KR); Hae Suk Chung, Suwon-si (KR); Chae Min Park, Suwon-si (KR); Byung Sung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/545,534

(22) Filed: Aug. 20, 2019

(65) Prior Publication Data

US 2020/0135404 A1 Apr. 30, 2020

(30) Foreign Application Priority Data

Oct. 29, 2018 (KR) ........................ 10-2018-0129859

(51) Int. Cl.
*B05D 5/12* (2006.01)
*B05D 3/02* (2006.01)
(Continued)

(52) U.S. Cl.
CPC ............. *H01G 4/30* (2013.01); *B05D 3/0254* (2013.01); *B05D 5/12* (2013.01); *C04B 41/4535* (2013.01);
(Continued)

(58) Field of Classification Search
None
See application file for complete search history.

(56) References Cited

U.S. PATENT DOCUMENTS 9,704,649 B2 * 7/2017 Saito ................. H01G 4/224
2010/0302704 A1 12/2010 Ogawa et al.
(Continued)

FOREIGN PATENT DOCUMENTS

| CA | 2214540 C | * 12/2005 |
| JP | H08-162357 A | 6/1996 |

(Continued)

OTHER PUBLICATIONS

Written opinion from Korean Intellectual Property Office in KR 10-2018-0129859 A, dated Dec. 20, 2019. (Year: 2019).*

(Continued)

*Primary Examiner* — William P Fletcher, III
(74) *Attorney, Agent, or Firm* — Morgan, Lewis & Bockius LLP

(57) ABSTRACT

A method of manufacturing a multilayer ceramic capacitor includes forming a water-repellent coating layer on surfaces of a multilayer ceramic capacitor having an internal electrode, a dielectric layer, and an external electrode; and removing at least a portion of the water-repellent coating layer formed on the surfaces of the external electrode such that another portion of the water-repellent coating layer remains on surfaces of the dielectric layer. The external electrode has first and second surfaces opposing each other in a thickness direction, third and fourth surfaces opposing each other in a width direction, and fifth and sixth surfaces opposing each other in a length direction.

13 Claims, 7 Drawing Sheets

(51) Int. Cl.
  *C04B 41/45*  (2006.01)
  *H01G 4/30*  (2006.01)
  *H01G 4/228*  (2006.01)
  *H01G 4/12*  (2006.01)
  *H01G 4/012*  (2006.01)
  *H01G 4/232*  (2006.01)

(52) U.S. Cl.
  CPC ............... *H01G 4/012* (2013.01); *H01G 4/12* (2013.01); *H01G 4/228* (2013.01); *H01G 4/232* (2013.01)

(56) References Cited

U.S. PATENT DOCUMENTS

| | | | |
|---|---|---|---|
| 2011/0287176 A1 | 11/2011 | Saito et al. | |
| 2015/0287532 A1* | 10/2015 | Abe | H01G 4/2325 174/260 |
| 2016/0042864 A1* | 2/2016 | Hong | H01G 4/30 361/301.4 |

FOREIGN PATENT DOCUMENTS

| | | | |
|---|---|---|---|
| JP | 2001102247 A | * | 4/2001 |
| KR | 10-2010-0129695 A | | 12/2010 |
| KR | 10-2011-0127594 A | | 11/2011 |
| KR | 10-2016-0016385 A | | 2/2016 |
| KR | 10-2016-0069816 A | | 6/2016 |

OTHER PUBLICATIONS

Office Action issued in corresponding Korean Patent Application No. 10-2018-0129859 dated Oct. 21, 2019, with English translation.

* cited by examiner

METHOD OF MANFACTURING MULTILAYER CERAMIC CAPACITOR AND MULTILAYER CERAMIC CAPACITOR

CROSS-REFERENCE TO RELATED APPLICATION(S)

This application claims the benefit under 35 USC 119 (a) of Korean Patent Application No. 10-2018-0129859 filed on Oct. 29, 2018 in the Korean Intellectual Property Office, the entire disclosure of which is incorporated herein by reference for all purposes.

BACKGROUND

1. Field

The present disclosure relates to a method of manufacturing a multilayer ceramic capacitor, and a multilayer ceramic capacitor.

2. Description of Related Art

Generally, an electronic component using a ceramic material, such as a capacitor, an inductor, a piezoelectric element or the like, includes a ceramic body formed of a ceramic material, an internal electrode formed inside the ceramic body, and an external terminal provided on the surface of the ceramic body to be connected to the internal electrode.

A multilayer ceramic capacitor (MLCC) in a ceramic electronic component includes a plurality of ceramic dielectric sheets, an internal electrode interposed between the plurality of ceramic dielectric sheets, and an external electrode electrically connected to the internal electrode.

Such a multilayer ceramic capacitor is small in size, may implement high capacitance, may be easily mounted on a substrate, and is widely used as a capacitive component of various electronic devices.

In recent multilayer ceramic capacitors, as conditions of use have become severe, due to high capacitance and high voltage, reliability at high temperature and high humidity, for example, humidity resistance, have been required. To provide such multilayer ceramic capacitors with moisture resistance load characteristics, a method of forming a moisture resistance protective layer on an exterior of a capacitor, and the like, have been used. However, when the protective layer is formed, there has been a problem of productivity, for example, a solder not being bonded to the surface of the external electrode at the time of mounting the capacitor on the substrate.

SUMMARY

An aspect of the present disclosure is to provide a method of manufacturing a multilayer ceramic capacitor, in which substrate mounting properties may be improved, while moisture resistance at a junction between dissimilar members of a multilayer ceramic capacitor may be improved.

An aspect of the present disclosure is to provide a multilayer ceramic capacitor having improved humidity resistance and improved substrate mounting properties.

According to an aspect of the present disclosure, a method of manufacturing a multilayer ceramic capacitor includes forming a water-repellent coating layer on a surface of a multilayer ceramic capacitor including an internal electrode, a dielectric layer, and an external electrode, and removing a portion of the water-repellent coating layer formed on a surface of the external electrode.

A multilayer ceramic capacitor having excellent substrate mounting properties, while effectively preventing moisture penetration at a junction between a ceramic body and an external electrode, may be manufactured by applying the above manufacturing method.

According to an aspect of the present disclosure, a multilayer ceramic capacitor includes a ceramic body in which an internal electrode and a dielectric layer are alternately laminated, a pair of external electrodes disposed on both ends of the ceramic body, and a water-repellent coating layer disposed on a first surface, a second surface, a third surface and a fourth surface of the ceramic body and at least some area of the pair of external electrodes.

The multilayer ceramic capacitor of the above structure may exhibit excellent moisture resistance reliability due to a water-repellent coating layer, and in addition, a solder is directly bonded to the external electrode due to the absence of a coating layer on a surface of the external electrode, thereby providing excellent substrate mounting performance.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
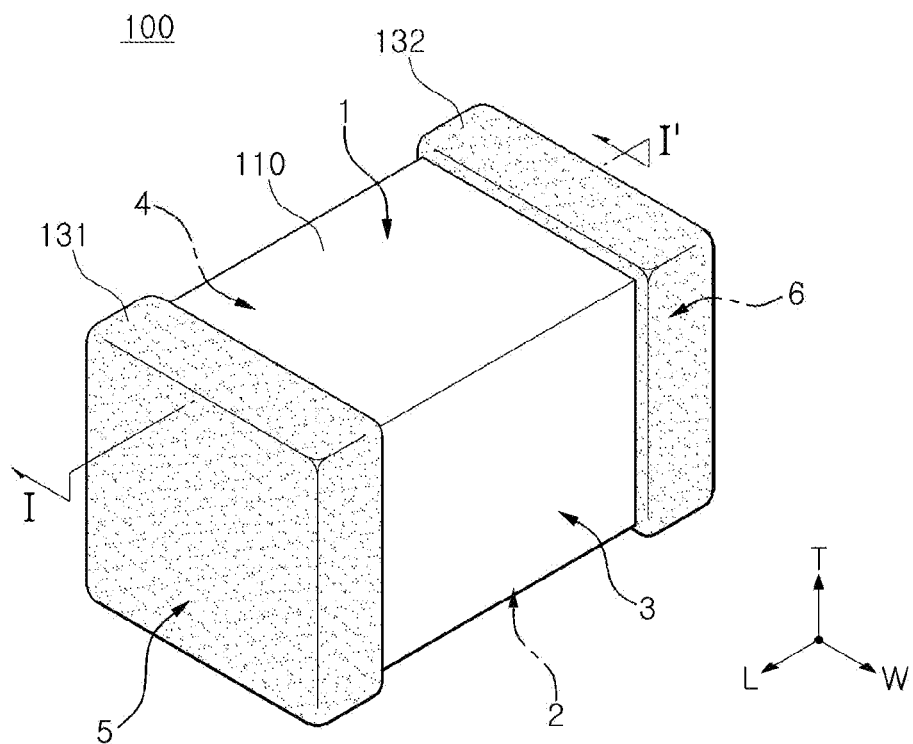
FIG. 1 is a schematic perspective view of a multilayer ceramic capacitor according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

In addition, the term "coupled" is used not only in the case of direct physical contact between the respective constituent elements in the contact relation between the constituent elements, but also in the case in which other constituent elements are interposed between the constituent elements such that they are in respective contact with each other, being used as a comprehensive concept.

The drawings may not be to scale, and the relative size, proportions, and depiction of elements in the drawings may be exaggerated for clarity, illustration, and convenience. Referring to the accompanying drawings, the same or corresponding components are denoted by the same reference numerals, and redundant descriptions thereof will be omitted.

Hereinafter, embodiments of the present disclosure will be described in detail with reference to the accompanying drawings.

Figure 2:
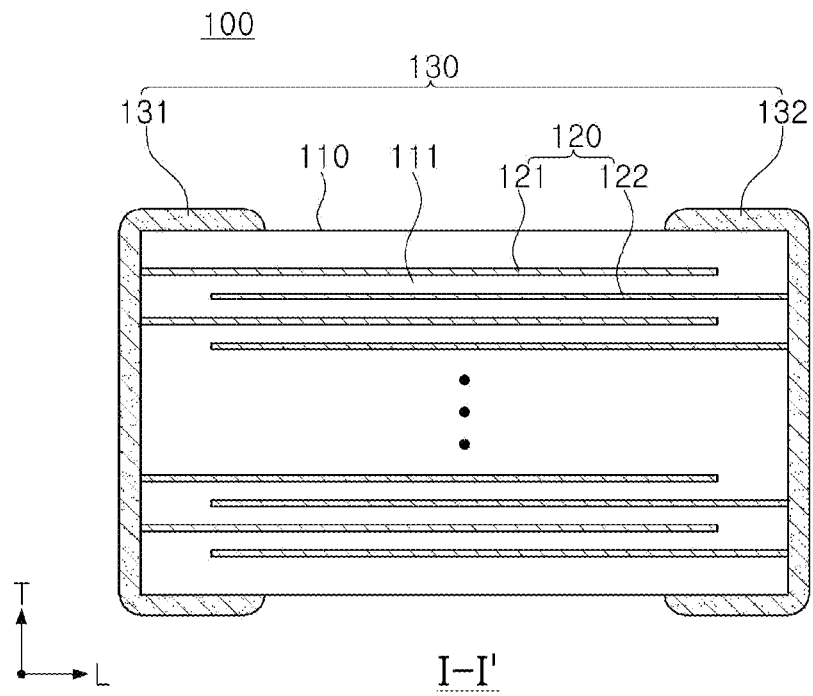
FIG. 2 is a cross-sectional view taken along line I-I' of FIG. 1.

FIG. 1 is a schematic perspective view of a multilayer ceramic capacitor according to an embodiment of the present disclosure. FIG. 2 is a cross-sectional view taken along line I-I' of FIG. 1.

Referring to FIGS. 1 and 2, a multilayer ceramic capacitor 100 according to an embodiment includes a ceramic body 110 including a plurality of internal electrodes 120, such as first and second internal electrodes 121 and 122 laminated therein and a dielectric material, and first and second external electrodes 131 and 132.

The ceramic body 110 may have a structure in which a dielectric layer 111 and the first and second internal electrodes 121 and 122 are alternately laminated.

The dielectric layer 111 may include a ceramic material having a high dielectric constant, for example, a barium titanate ($BaTiO_3$)-based material or a strontium titanate ($SrTiO_3$)-based material, but as the material thereof, other materials known in the art may be used as long as sufficient capacitance may be obtained therefrom. The dielectric layer 111 may be a ceramic sheet obtained by manufacturing a ceramic material in the form of a sheet, but an embodiment thereof is not limited thereto.

A thickness of the dielectric layer 111 may be arbitrarily changed depending on the capacitance design of a capacitor. For example, the thickness of the dielectric layer 111 after firing may be 0.1 μm or more per layer, but is not limited thereto.

The first and second internal electrodes 121 and 122 are connected to first and second external electrodes 131 and 132, respectively, and may have different polarities when driven. The first and second internal electrodes 121 and 122 may be obtained by printing a paste containing a conductive metal to a predetermined thickness on one surface of a ceramic sheet and then sintering the paste.

In this case, the end surfaces of the first and second internal electrodes 121 and 122 may be alternately exposed to the ceramic body 110 in a lamination direction as illustrated in FIG. 2, and the first and second internal electrodes 121 and 122 may be electrically separated from each other by the dielectric layer 111 disposed therebetween. The internal electrodes 121 and 122 may be classified as a first internal electrode 121 and a second internal electrode 122 depending on a polarity during driving.

Examples of main constituent materials of the first and second internal electrodes 121 and 122 include, but are not limited to, nickel (Ni), copper (Cu), palladium (Pd), silver (Ag) and the like.

A thicknesses of the first and second internal electrodes 121 and 122 may be determined according to the use and the like, and are not particularly limited. For example, the thickness of the first and second internal electrodes 121 and 122 may be 0.1 to 5 μm or 0.1 to 2.5 μm.

The first and second external electrodes 131 and 132 are formed on an external surface of the ceramic body 110 to be electrically connected to the first and second internal electrodes 121 and 122. At least a portion of the first internal electrode 121 is exposed to the ceramic body 110 to contact the first external electrode 131. At least a portion of the second internal electrode 122 is exposed to the ceramic body 110 to contact the second external electrode 132.

The first and second external electrodes 131 and 132 may be formed by a method of producing a material containing a conductive metal as a paste and then applying the produced paste to the ceramic body 110, or the like. Examples of the conductive metal include nickel (Ni), copper Cu), palladium (Pd), gold (Au), or alloys thereof, but are not limited thereto.

The thickness of the first and second external electrodes 131 and 132 may be appropriately determined according to the use thereof or the like, and is not particularly limited, but may be, for example, 10 to 50 μm.

A method of manufacturing the multilayer ceramic capacitor is not particularly limited. For example, a conductive paste for an internal electrode is applied to the above-mentioned ceramic sheet by a screen printing method to form internal electrodes. Then, a plurality of ceramic sheets on which internal electrodes are printed are laminated, and a plurality of unprinted green sheets are laminated on upper and lower surfaces of the ceramic body, to then be fired to produce the ceramic body 110. A conductive paste for an external electrode is sprayed onto ends (fifth and sixth surfaces) of the ceramic body 110, and the sprayed conductive paste for the external electrode is then sintered. The method of manufacturing the multilayer ceramic capacitor is not limited thereto.

The shape of the ceramic body 110 is not particularly limited, but may generally be a hexahedral shape. The ceramic body 110 may not have a complete hexahedral shape due to a difference in thickness thereof due to shrinkage of ceramic powder at the time of firing a chip, presence or absence of an internal electrode pattern and polishing of a corner portion of the ceramic body, but may have a shape substantially similar to a hexahedron. The dimensions of the ceramic body 110 are not particularly limited, and may be, for example, (0.6 to 5.6 mm)*(0.3 to 5.0 mm)*(0.3 to 1.9 mm). In addition, the number of laminated layers of the dielectric layer 111 of the ceramic body 110 may be adjusted according to the intended use of a multilayer ceramic capacitor, for example, may be from 10 to 500 layers, but is not limited thereto.

To clearly illustrate embodiments of the present disclosure, the directions of the hexahedron may be defined. For example, L, W, and T illustrated in the drawings refer to a length direction, a width direction, and a thickness direction, respectively. In this case, the thickness direction may be used in the same concept as a lamination direction in which the dielectric layers 111 are laminated. In the present disclosure, the length direction may refer to a first direction, the width direction may refer to a second direction, and the thickness direction may refer to a third direction.

As illustrated in FIG. 1, the ceramic body 110 and the external electrodes 131 and 132 may have first and second surfaces 1 and 2 opposing each other in the thickness direction, third and fourth surfaces 3 and 4 opposing each other in the width direction, and fifth and sixth surfaces 5 and 6 opposing in the length direction.

Figure 3:
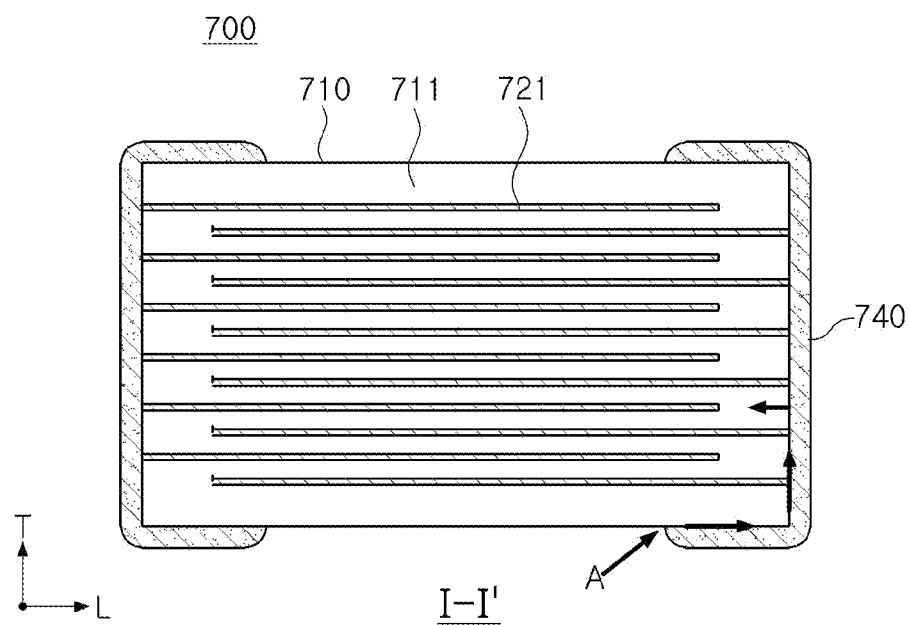
FIG. 3 is a view illustrating a moisture penetration path in a multilayer ceramic capacitor of the related art.

FIG. 3 is a view illustrating a moisture penetration path of a multilayer ceramic capacitor of the related art. A multilayer ceramic capacitor 700 of the related art may not withstand moisture and moisture load at a junction between a dielectric layer 711 of a ceramic body 710 and an external electrode 740, causing a moisture penetration path in an arrow direction (→) as illustrated in FIG. 3.

Shorting due to moisture penetrated into the internal electrode 721 along a joint surface between the ceramic body 710 and the external electrode 740 causes an abnormality in electrical properties of a component, causing deterioration of the reliability of the multilayer ceramic capacitor.

Figure 4:
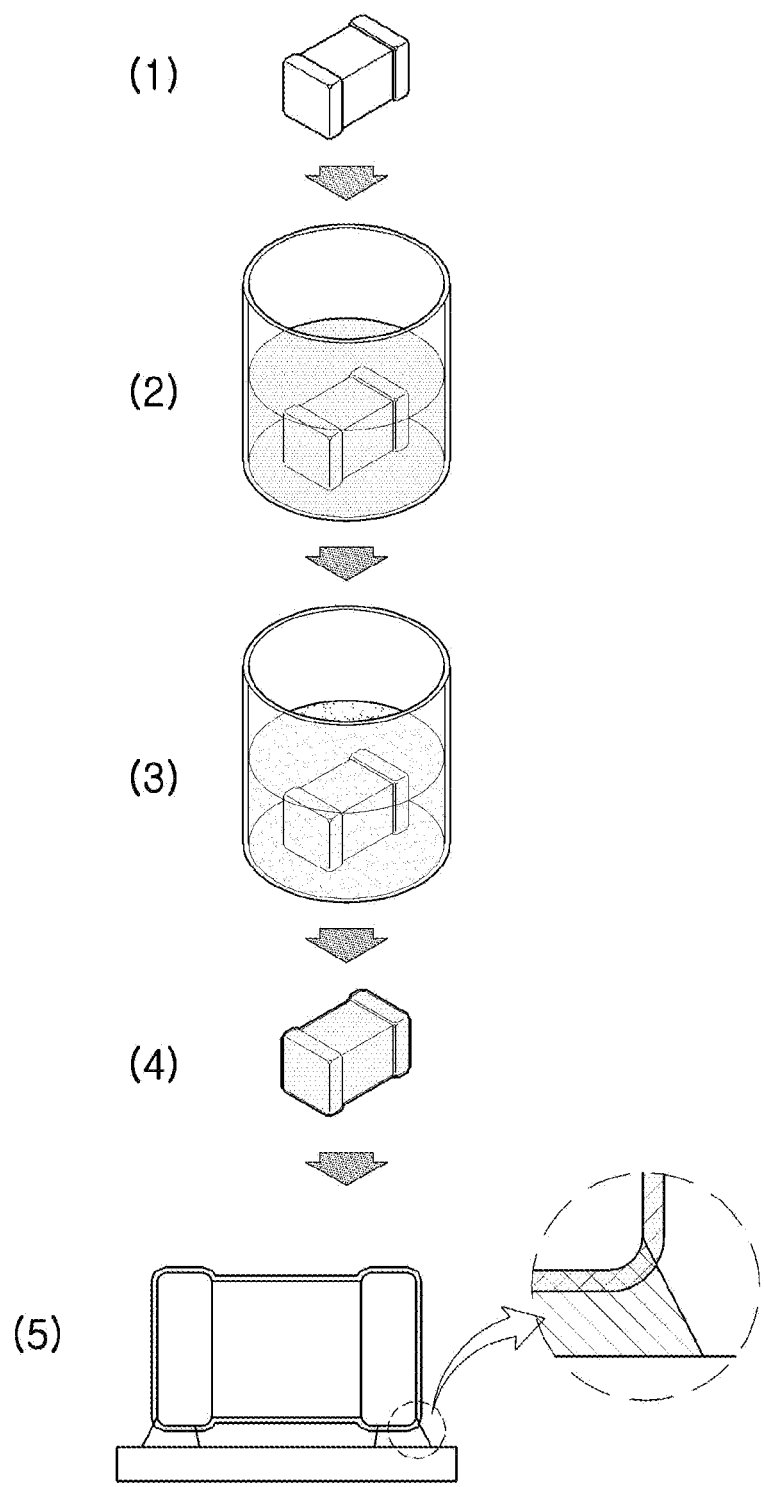
FIG. 4 is a schematic view illustrating a process of manufacturing a multilayer ceramic capacitor according to the related art.

To prevent such a moisture penetration problem, a method of applying a water-repellent coating layer to the exterior of a multilayer ceramic capacitor has been used. FIG. 4 is a schematic view illustrating a problem of the related art in using a water-repellent coating layer.

Referring to FIG. 4 illustrating the related art, there is a method of dipping a manufactured multilayer ceramic capacitor (1) in a water-repellent coating solution (2), cleaning (3) the multilayer ceramic capacitor, and forming (4) a water-repellent coating layer by heat treatment or the like. However, due to the water-repellent coating layer present on an external electrode (5), there is a problem that the external electrodes and a solder are not joined when the multilayer ceramic capacitor is mounted on a substrate.

According to one embodiment of the present disclosure, in order to prevent the above problem of the related art, a multilayer ceramic capacitor having excellent moisture resistance and improved substrate mounting performance, and a method of manufacturing the same, are provided.

A method of manufacturing a multilayer ceramic capacitor according to one embodiment of the present disclosure may include forming a water-repellent coating layer on a surface of a multilayer ceramic capacitor including an internal electrode, a dielectric layer, and an external electrode; and removing a portion of the water-repellent coating layer formed on a surface of the external electrode. As used herein, the term, a "portion" of a surface, may refer to an area of more than 0% to less than 100% to the entire surface area, for example, an area of 1% or more to 99% or less, or an area of 5% or more to 95% or less, but an embodiment thereof is not limited thereto. Excellent substrate mounting properties may be secured by removing a portion of the water-repellent coating layer formed on the surface of the external electrode.

The water-repellent coating layer may be formed to include a material having a hydrophobic functional group, and may be a surface-modified coating layer that modifies a junction between a ceramic body and an external electrode to a hydrophobic surface.

In one example, the water-repellent coating layer may be formed of a silane-based compound using a silane-coupling agent. In the case of the water-repellent coating layer as described above, one end of a silicon (Si) atom is covalently bonded or hydrogen bonded to the surface of a dielectric layer, and the other end of the silicon (Si) atom is bonded to a hydrophobic functional group.

In detail, the silane coupling agent has two functional groups having different reactivities in one molecule, for example, a hydrophilic group and a hydrophobic group, which may be represented by the following formula 1.

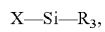

where $R_3$ is a hydrolysis hydrophilic functional group, and X is a nonhydrolyzable hydrophobic functional group.

As an example, $R_3$ may be a functional group that chemically bonds with an inorganic material, and may be an alkoxy group (R—O) such as a methoxy ($CH_3O$—) or an ethoxy ($C_2H_5O$—) group.

As an example, X may comprise an epoxy group, a vinyl group ($CH_2CH$—), an amino group (—$NH_2$), a methacryl group, and/or a mercapto group (SH—), but the examples thereof are not limited thereto.

As an example, as the silane coupling agent, 3-glycidoxypropyltrimethoxysilnae (GPTMS), 3-glycidoxypropyltriethoxysilnae (GPTES), vinyltriethoxysilane, aminopropyltrimethoxysilane (APTMS), or the like may be used, but the examples thereof are not limited thereto. These silane-coupling agents may be used alone or in combination of two or more.

In detail, since 3-glycidoxypropyltrimethoxysilane (GPTMS) is not bulky and may thus be easily hydrolyzed, 3-GPTMS may be used as the silane coupling agent.

The water-repellent coating layer according to one embodiment of the present disclosure may be formed in a weight/thickness range of 0.25 $g/m^2$ to 30.0 $g/m^2$, or 0.5 $g/m^2$ to 2.0 $g/m^2$ by a silicon atom conversion. If the weight/thickness (in terms of silicon atom conversion) of the water-repellent coating layer is less than 0.25 $g/m^2$, an adhesion with a dielectric layer is decreased, and improvement of moisture resistance may become difficult. If the weight/thickness of the water-repellent coating layer (in terms of silicon atom conversion) exceeds 30.0 $g/m^2$, manufacturing costs may be increased without further improving adhesion.

In one example of the present disclosure, the method of manufacturing a multilayer ceramic capacitor may further include performing a heat treatment after forming the water-repellent coating layer. Adhesion of the coating layer may be improved by performing the heat treatment, and a reaction rate of a silane coupling of the water-repellant coating layer may be increased by the heat treatment.

Hereinafter, a water-repellent coating layer comprising a silane compound is described in detail.

The water-repellent coating layer comprises a hydrophobic silane compound in which one end of the Si atom has a covalent bond or a hydrogen bond to the surface of the dielectric layer and the other end of the Si atom is bonded to the hydrophobic functional group (X).

Such a water-repellent coating layer is a Self-Assembled Monomer (SAHs) film formed by the reaction mechanism of Reaction Formula 1 below. The reaction mechanism of a formation process of the water-repellent coating layer by the self-assembled monomer method is described below with reference to the following Reaction Formula 1.

The water-repellent coating layer formed on the surface of the dielectric layer by the reaction mechanism described above may modify the surface of the dielectric layer exhibiting hydrophilic properties to be hydrophobic. Thus, moisture penetration at a joint surface between the dielectric layer and the external electrode may be prevented, to improve humidity resistance of a device in an environment of high temperature and high humidity.

Figure 5:
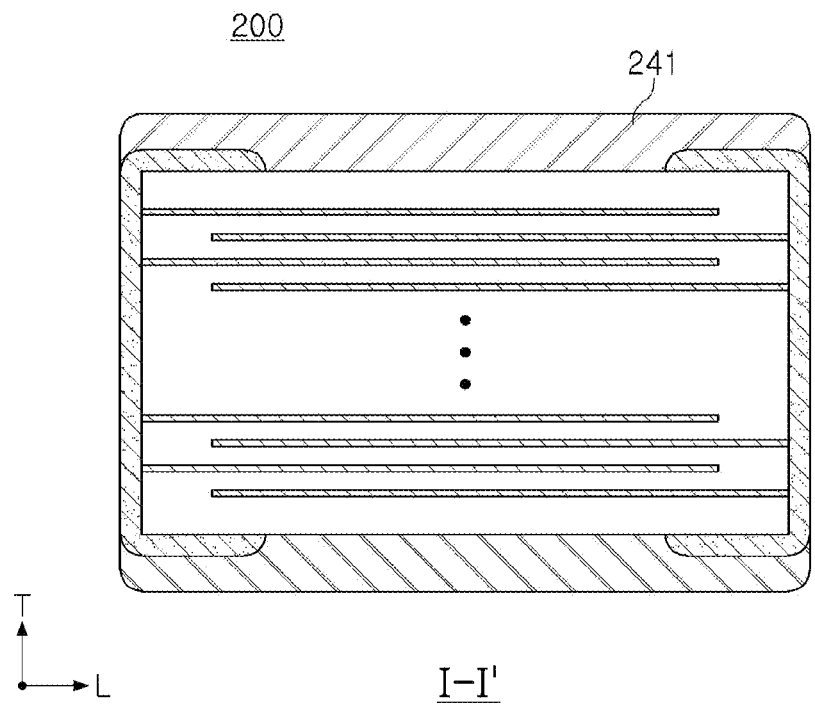
FIG. 5 is a cross-sectional view of a multilayer ceramic capacitor according to an embodiment of the present disclosure.

In one example, removing a portion of the water-repellent coating layer may be performed by removing coating of a surface of an external electrode, which is perpendicular to a first direction. FIG. 5 is a cross-sectional view schematically illustrating a multilayer ceramic capacitor manufactured

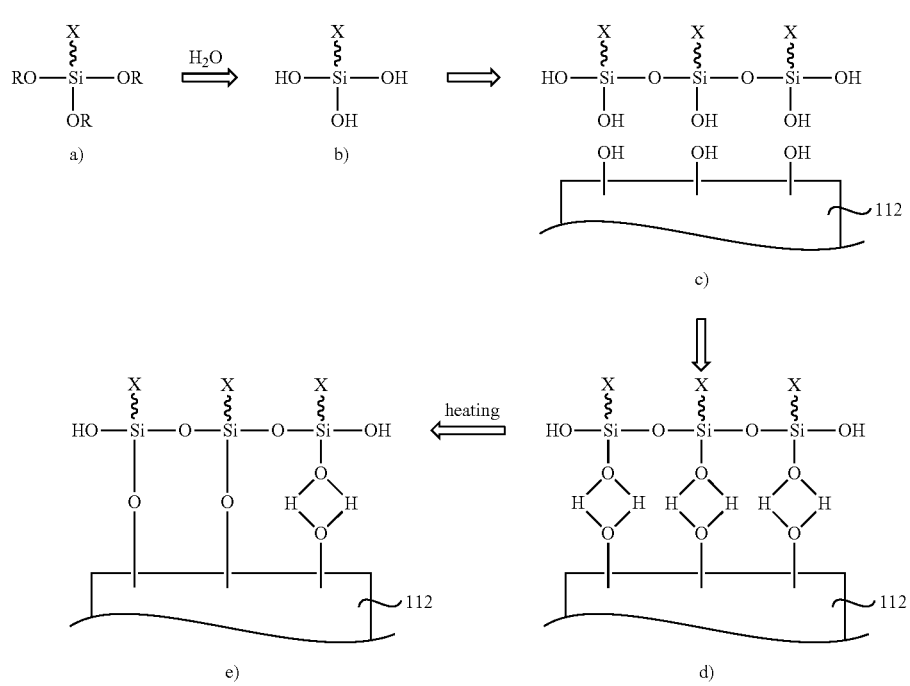

[Reaction Formula 1]

First, a silane coupling agent is prepared in which one hydrophobic functional group (X) is bonded to one end of the Si atom as a starting material and an alkoxy group (OR) is bonded to the other three ends of the Si atom (a)).

The prepared silane coupling agent is then dissolved in water ($H_2O$). In this process, the alkoxyl group (Si—OR) of the silane coupling agent is hydrolyzed by water ($H_2O$) to be converted into a silanol group (Si—OH) (b))), and then siloxane linkage (—Si—O—Si—) is generated (C)). At this time, in operation (C)), a ceramic body in which a dielectric layer having a hydroxyl group (—OH) on the surface thereof is formed may be immersed in a siloxane compound solution.

As a result, the hydroxyl group (—OH) on the surface of the dielectric layer and the silanol group (Si—OH) of the siloxane compound are self-assembled to form a hydrogen bond (d)), to then undergo a dehydration condensation reaction by heating, as a result, forming oxygen-mediated covalent bonds (e)).

On the other hand, the ceramic body having external electrodes on both ends thereof may be immersed in the siloxane compound solution in an operation (d)), and the operation (d)) may further include a heating operation to increase the reaction rate.

according to one embodiment of the present disclosure. Referring to FIGS. 1 and 5, the surfaces of the external electrode, which are perpendicular to the first direction in the multilayer ceramic capacitor 100, may refer to a fifth surface and a sixth surface. When a coating on the surface of the external electrode, which is perpendicular to the first direction, is removed in a multilayer ceramic capacitor 200 according to an embodiment, a water-repellent coating layer is not present on the fifth and sixth surfaces of the external electrode, and a water-repellent coating layer 241 may only be disposed on a first surface, a second surface, a third surface and a fourth surface of a ceramic body, and a first surface, a second surface, a third surface and a fourth surface of the external electrode. At least a portion of the water-repellant coating layer formed on the surface of the external electrode, for example, the coating on the fifth surface and the sixth surface which are perpendicular to the first direction, is removed, thereby improving bonding properties thereof with a solder and thus improving substrate mounting performance.

Figure 6:
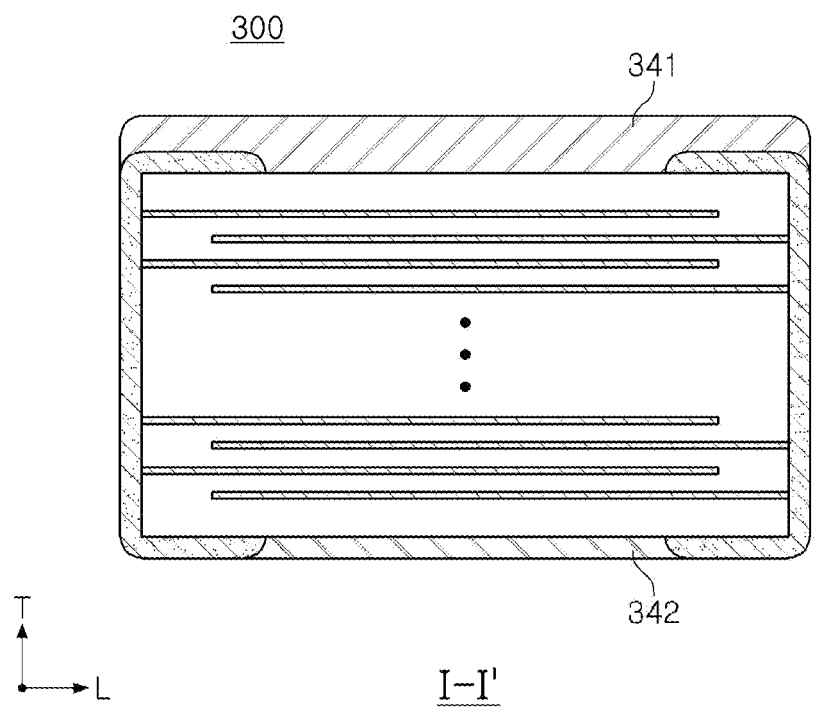
FIG. 6 is a cross-sectional view of a multilayer ceramic capacitor according to an embodiment of the present disclosure.

In an example of the present disclosure, removing a portion of a water-repellent coating layer may be performed by removing a coating on a surface of the external electrode, perpendicular to the first direction and a second surface of the external electrode. FIG. 6 is a cross-sectional view schematically illustrating a multilayer ceramic capacitor 300 in which the coating on the surface of the external electrode perpendicular to the first direction and the second surface of the external electrode are removed. When the coating on the second surface of the external electrode and the surface of the external electrode perpendicular to the first direction are removed, the water-repellent coating layer does not exist on the second surface, the fifth surface and the sixth surface of the external electrode, while a water-repellent coating layer 341 may only be disposed on a first surface, a second surface, a third surface, a fourth surface, a fifth surface and a sixth surface of a ceramic body and on a first surface, a third surface, and a fourth surface of the external electrode. In this case, the water-repellent coating layer 342 is present on the second surface of the ceramic body to prevent moisture penetration at the boundary surface between the ceramic body and the external electrode on the second surface of the multilayer ceramic capacitor, and in addition, since the water-repellent coating layer is not present on the fifth and sixth surfaces, and excellent substrate mounting performance may be ensured.

Figure 7:
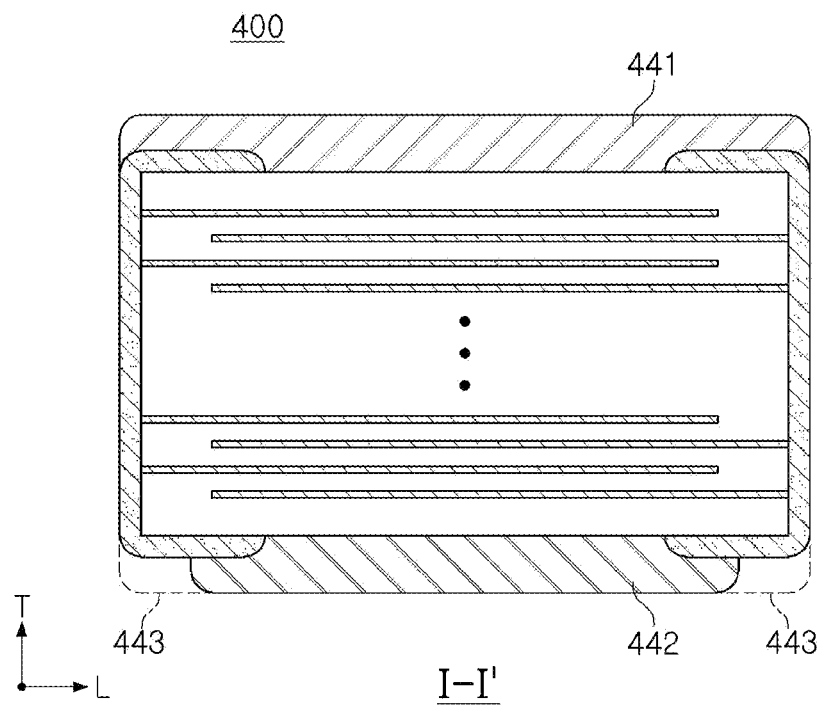
FIG. 7 is a cross-sectional view of a multilayer ceramic capacitor according to an embodiment of the present disclosure.

Removing the coating on the second surface of the external electrode may be performed by, for example, removing a portion of the coating on the second surface of the external electrode. FIG. 7 is a cross-sectional view schematically illustrating a multilayer ceramic capacitor in which the coating on the surface of the external electrode perpendicular to the first direction and a portion of the coating on the second surface of the external electrode are removed. When the coating on the surface of the external electrode perpendicular to the first direction and a portion of the coating on the second surface of the external electrode are removed, a water-repellent coating layer is not present on the fifth surface and the sixth surface of the external electrode and a portion of the second surface of the external electrode. The water-repellent coating layers 441 and 442 may only be disposed on the first surface, the second surface, the third surface, the fourth surface, the fifth surface and the sixth surface of the ceramic body and on the first surface, the third surface, the fourth surface, and a portion of the second surface of the external electrode. In this case, the water-repellent coating layer 442 is present on the surface of the second surface of the ceramic body and on a portion of the external electrode disposed on the second surface of the ceramic body, such that moisture penetration at the joint surface between the ceramic body and the external electrode on the second surface of the multilayer ceramic capacitor may be prevented, and in addition, excellent substrate mounting performance may be secured due to absence of the water-repellent coating layer on a portion 443 of the second surface of the external electrode, and on the fifth surface and the sixth surface of the external electrode.

Figure 8:
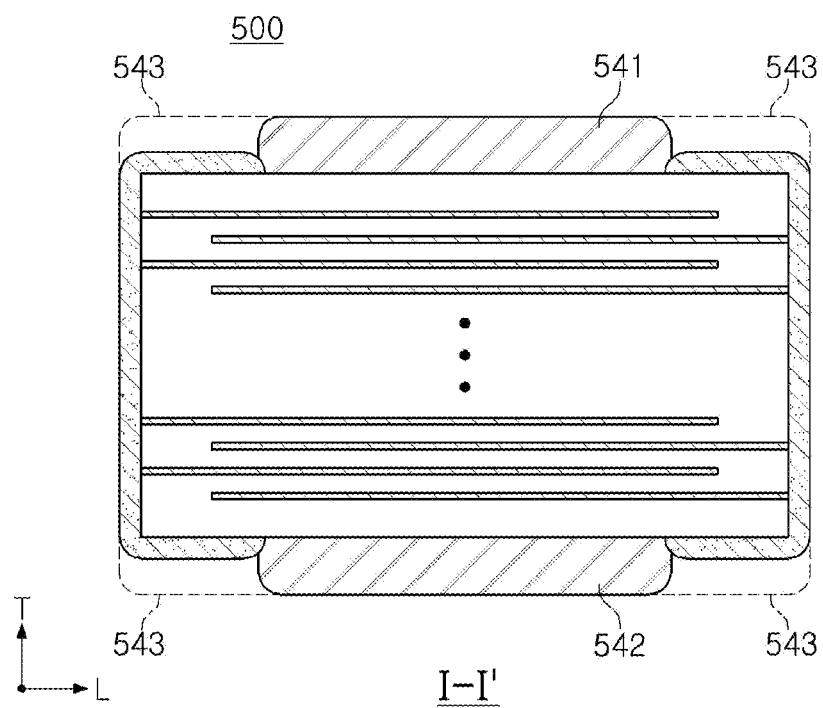
FIG. 8 is a cross-sectional view of a multilayer ceramic capacitor according to an embodiment of the present disclosure.

In another example of the present disclosure, removing a portion of the water-repellent coating layer may be performed by removing the coating disposed on the surface of the external electrode, which is perpendicular to the first direction, and the coating of the first surface, the second surface, the third surface and the fourth surface of the external electrode. FIG. 8 is a cross-sectional view schematically illustrating a multilayer ceramic capacitor in which the coating on the surface of the external electrode, which is perpendicular to the first direction, and the coating on the first surface, the second surface, the third surface and the fourth surface of the external electrode are removed. When the coating disposed on the surface of the external electrode, which is perpendicular to the first direction, and the coating of the first surface, the second surface, the third surface and the fourth surface of the external electrode are removed, the water-repellent coating layer is not present on the surfaces of the first surface, the second surface, the third surface, the fourth surface, the fifth surface and the sixth surface of the external electrode, while the water-repellent collating layer may only be disposed on the first surface, the second surface, the third surface, the fourth surface, the fifth surface, and the sixth surface of the ceramic body. Also in this case, the moisture penetration may be prevented on the surfaces of boundary between the ceramic body and the external electrode by the water-repellent coating layer on the surfaces of the first, second, third, fourth, fifth and sixth surfaces of the ceramic body, and further, bonding properties of a solder may be secured at the time of mounting thereof on a substrate due to absence of a water-repellent coating layer 543 on the surfaces of the second, third, fourth, fifth and sixth surfaces of the external electrode.

Figure 9:
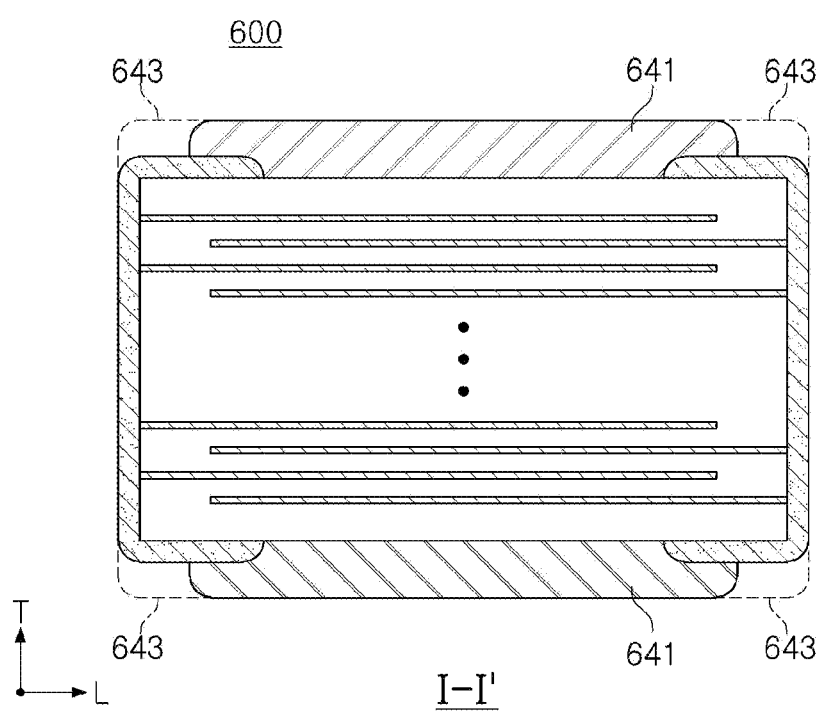
FIG. 9 is a cross-sectional view of a multilayer ceramic capacitor according to an embodiment of the present disclosure.

Removing the coating on the first surface, the second surface, the third surface and the fourth surface of the external electrode may be performed by, for example, removing portions of the coating of the first surface, the second surface, the third surface and the fourth surface of the external electrode. FIG. 9 is a cross-sectional view schematically illustrating a multilayer ceramic capacitor in which portions of the coating on the first surface, the second surface, the third surface and the fourth surface of the external electrode, and the coating on a surface of the external electrode perpendicular to the first direction, are removed. Referring to FIG. 9, in a multilayer ceramic capacitor 600 in which portions of the coating on the first surface, the second surface, the third surface and the fourth surface of the external electrode are removed, the water-repellent coating layer may only be disposed on the surfaces of the first surface, the second surface, the third surface and the fourth surface of the ceramic body and on the portions 641 of the first, second, third and fourth surfaces of the external electrode. In the case of the multilayer ceramic capacitor having the above-described structure, moisture penetration may be prevented by the water-repellent coating layer 641 covering the joint surface of the ceramic body and the external electrode, and further, bonding properties of the solder may be secured due to absence of the water-repellent coating layer 643 on portions 643 of the first, second, third and fourth surfaces of the external electrode and on the surfaces of the fifth surface and the sixth surface of the external electrode.

The method of removing the water-repellent coating layer according to an embodiment is not particularly limited, and a known method may be selected and used depending on properties of a coating layer to be removed. As the method of removing a water-repellent coating layer, for example, dry etching or wet etching may be used. In the case of using dry etching, the coating layer may be removed by using ultraviolet rays, plasma or the like, and in the case of using wet etching, the coating layer may be removed using a coating removing solution or the like, but an embodiment thereof is not limited thereto.

Embodiment 1

Hereinafter, the configuration and operations of the present disclosure will be described in more detail with reference to an embodiment of the present disclosure. It is to be understood, however, that the present disclosure is not limited to the described embodiment, and cannot be construed as limiting the present disclosure.

The contents not described here are sufficiently technically inferred by those skilled in the art, and a description thereof will be omitted.

1. Preparation of a Sample of a Coating Solution

KBM-403 solution having a concentration of 2% was prepared by mixing 98 g of pure water with 2 g of 3-Glycidoxypropyl trimethoxysilane (KBM-403) manufactured by Shin-Etsu Co., and then, was stirred at 250 rpm for 2 hours at 25° C. using a magnetic bar, to prepare a coating solution.

2. Manufacture of a Water-Repellent Coated Multilayer Ceramic Capacitor

A multilayer ceramic capacitor (3225 size (3.2 mm×2.5 mm×2.5 mm), 22 μF, 16V product (model name: 32B226KOJVPN)) was prepared, and 100 g of the coating solution prepared in the above section 1 was heated to 60° C. Then, 300 multilayer ceramic capacitors were immersed therein for 1 hour to coat the surface thereof with a silane compound. Then, the silane-coated multilayer ceramic capacitor was cleaned five times with pure water, and then dried at room temperature of 25° C. for 12 hours, and then subjected to a heat treatment at 120° C. for 30 minutes.

The process conditions of Embodiment 1 are as in Table 1 below.

TABLE 1

| Classification | Conditions | |
|---|---|---|
| Coating solution preparation | Pure water | 98 g |
| | 3-Glycidoxypropyl trimethoxtsilane | 2 g |
| | Concentration | 2% |
| | Temperature | Room Temperature (25° C.) |
| | Time | 2 hours |
| | Stirring speed | 250 rpm |
| Coating | Impregnation Input Amount | 300 Pieces |
| | Coating solution | 100 g |
| | Temperature | 60° C. |
| | Time | One Hour |
| Cleaning | Pure Water | 5 Times |
| | Temperature | Room Temperature (25° C.) |
| Dry | Time | 12 hours |
| | Temperature | Room Temperature (25° C.) |
| Heat Treatment | Temperature | 120° C. |
| | Time | 30 minutes |

3. Removal of Selective Removal of Water-Repellent Coating Layer

Figure 10:
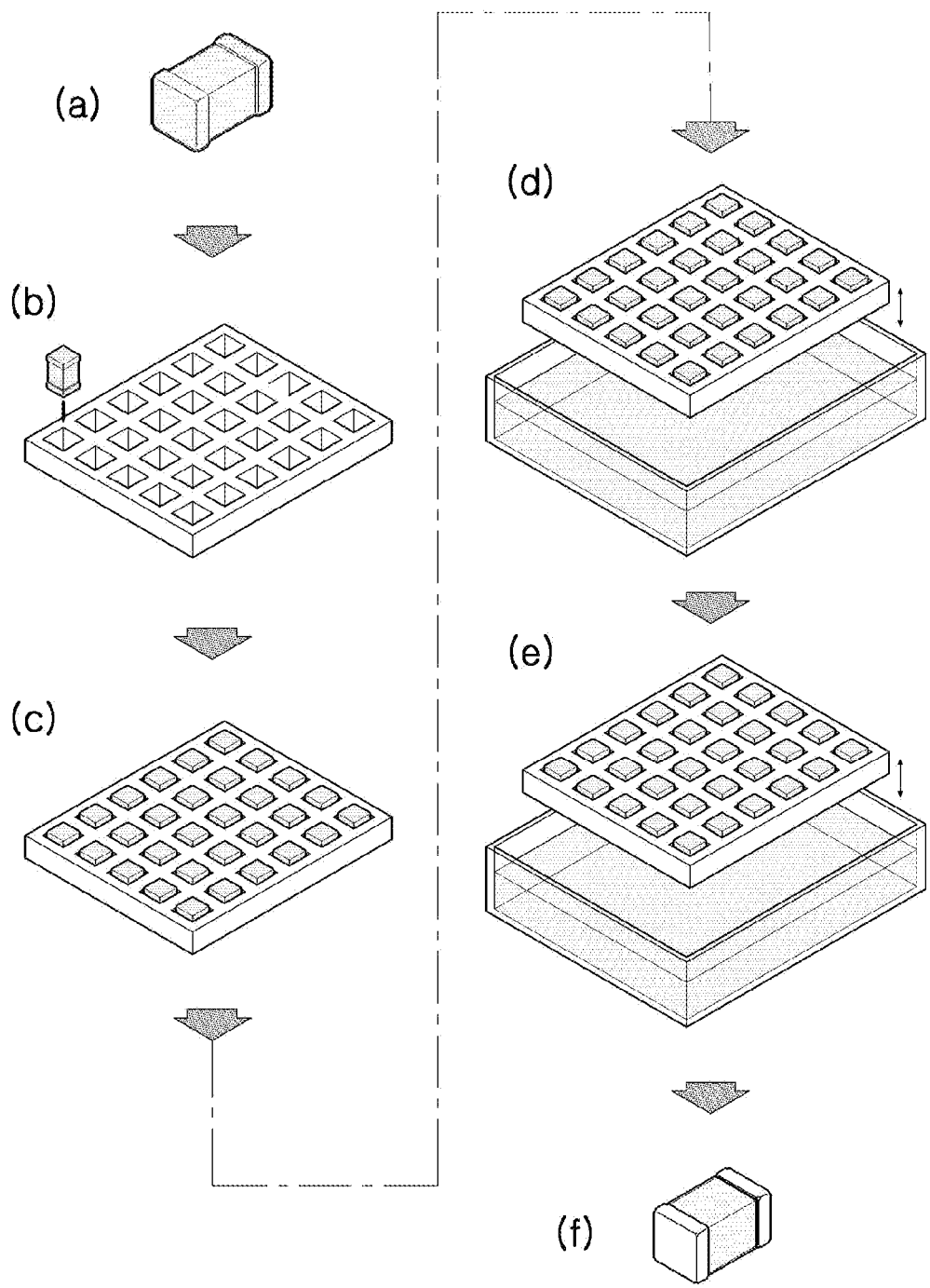
FIG. 10 is a schematic view illustrating a process of manufacturing a multilayer ceramic capacitor according to an embodiment of the present disclosure.

FIG. 10 is a schematic view illustrating a process of manufacturing a multilayer ceramic capacitor according to an embodiment of the present disclosure. Referring to FIG. 10, a multilayer ceramic capacitor (a) having a water-repellent coating layer formed thereon is mounted on a coating removal jig (b) and (c) prepared to exposed an external electrode thereof, to then be immersed in a coating removal solution, obtained by mixing 50 mL of hydrochloric acid (HCl) and 50 mL of distilled water at a volume ratio of 1:1, for about 10 seconds, to selectively only remove a coating layer present on the external electrode (d) and (e).

Comparative Example

A multilayer ceramic capacitor (see (a) of FIG. 10) from which the water-repellent coating layer was not removed was used.

Property Evaluation

Respectively 80 multilayer ceramic capacitors according to the embodiment and the comparative example were mounted on test boards (20 channel 400 ea), and the humidity resistance test and a solderability test were undertaken on the multilayer ceramic capacitors of the embodiment and the comparative example. The results of the humidity resistance test and the solderability test performed are shown in Table 2 below.

TABLE 2

| Classification | Conditions | Humidity resistance test | Solderability Test |
|---|---|---|---|
| Embodiment 1 | 85° C., 85%, 340 hours, 16 V, 80 pieces | OK | ○ |
| Comparative Example | | OK | X |

<Criteria>
NG (bad): Dissatisfactory at least one of capacitance, DF, and insulation resistance (IR)
OK (Good): All three specs of capacitance, DF and IR satisfied.
○: No bonding failure
X: Poor junction (1 or more, 1.25%)

Referring to Table 2, it can be seen that both the embodiment and the comparative example to which the water-repellent coating layer was applied did not cause moisture-proof failure, and that defects due to moisture penetration were prevented.

However, in the case of the embodiment in which the water-repellent coating layer is selectively removed, defective solder bonding is not caused at the time of substrate mounting. Meanwhile, in the comparative example in which the water-repellent coating layer is not removed, it can be confirmed that defective bonding of the solder occurred due to the water-repellent coating layer formed on the surface of the external electrode.

From the above results, it can be seen that a method of manufacturing a multilayer ceramic capacitor according to an embodiment and a multilayer ceramic capacitor manufactured using the same may provide excellent substrate mounting performance, while securing moisture resistance reliability, such that a multilayer ceramic capacitor having improved productivity may be provided.

As set forth above, in a method of manufacturing a multilayer ceramic capacitor, and a multilayer ceramic capacitor according to an embodiment, moisture resistance at a junction between dissimilar members of a multilayer ceramic capacitor may be improved, and excellent substrate mounting properties may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a multilayer ceramic capacitor, comprising:

forming a water-repellent coating layer on surfaces of a multilayer ceramic capacitor comprising an internal electrode, a dielectric layer, and an external electrode, wherein the external electrode has first and second surfaces opposing each other in a thickness direction, third and fourth surfaces opposing each other in a width direction, and fifth and sixth surfaces opposing each other in a length direction; and removing at least a portion of the water-repellent coating layer formed on a surface of the external electrode such that another portion of the water-repellent coating layer remains on a surface of the dielectric layer and on a portion of at least the first and second surfaces at which the external electrode has a maximum thickness.

2. The method of claim 1, wherein the water-repellent coating layer includes silane.

3. The method of claim 1, further comprising performing a heat treatment after the forming a water-repellent coating layer.

4. The method of claim 1, wherein the removing at least a portion of the water-repellent coating layer is performed by removing the water-repellent coating layer disposed on the fifth and sixth surfaces of the external electrode.

5. The method of claim 1, wherein the removing at least a portion of the water-repellent coating layer is performed by removing the water-repellent coating layer disposed on the second, fifth and sixth surfaces of the external electrode.

6. The method of claim 1, wherein the removing at least a portion of the water-repellent coating layer is performed by removing the water-repellant coating layer disposed on the fifth and sixth surfaces of the external electrode and a portion of the water-repellant coating layer disposed on the second surface of the external electrode.

7. The method of claim 1, wherein the removing at least a portion of the water-repellent coating layer is performed by removing the water-repellant coating layer disposed on the first surface, the second surface, the third surface, the fourth surface, the fifth surface, and the sixth surface of the external electrode.

8. The method of claim 1, wherein the removing at least a portion of the water-repellent coating layer is performed by removing the water-repellent coating layer disposed on the fifth and sixth surfaces of the external electrode and a portion of the water-repellent coating layer disposed on the first surface, the second surface, the third surface and the fourth surface of the external electrode.

9. The method of claim 1, wherein the water-repellent coating layer includes a silane coupling agent represented by the following formula:

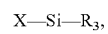

where $R_3$ is a hydrolysis hydrophilic functional group, and X is a nonhydrolyzable hydrophobic functional group.

10. The method of claim 9, wherein $R_3$ is an alkoxy group (R—O).

11. The method of claim 10, wherein the alkoxy group is methoxy ($CH_3O$—) or an ethoxy ($C_2H_5O$—) group.

12. The method of claim 9, wherein X comprises a functional group selected from the group consisting of an epoxy group, a vinyl group ($CH_2CH$—), an amino group (—$NH_2$), a methacryl group, a mercapto group (SH—), and a mixture thereof.

13. The method of claim 9, wherein the silane coupling agent comprises one selected from the group consisting of 3-glycidoxypropyltrimethoxysilane (GPTMS), 3-glycidoxypropyltriethoxysilane (GPTES), vinyltriethoxysilane, aminopropyltrimethoxysilane (APTMS), and a mixture thereof.

* * * * *